United States Patent [19]
Lhota

[11] Patent Number: 4,793,380
[45] Date of Patent: Dec. 27, 1988

[54] SWITCH-OVER VALVE, PREFERABLY FOR AN AIR DRIER

[75] Inventor: Jiri E. J. Lhota, Helsingborg, Sweden

[73] Assignee: Garphyttan Haldex AB, Landskrona, Sweden

[21] Appl. No.: 136,351

[22] Filed: Dec. 22, 1987

[30] Foreign Application Priority Data

Dec. 22, 1986 [SE] Sweden ............... 8605524

[51] Int. Cl.⁴ ............... F16K 11/10
[52] U.S. Cl. ............... 137/627.5; 137/596.18; 137/596.2
[58] Field of Search ............ 137/627.5, 596.2, 596.18

[56] References Cited

U.S. PATENT DOCUMENTS

| | | | |
|---|---|---|---|
| 3,270,774 | 9/1966 | Stuart | 137/596.8 |
| 3,643,402 | 2/1972 | Wireman | 55/33 |
| 3,692,367 | 9/1972 | Kuromitsu | 137/596.2 X |
| 4,117,865 | 10/1978 | Beck | 137/596.18 X |

Primary Examiner—Alan Cohan
Attorney, Agent, or Firm—Laurence R. Brown; Alfred J. Mangels

[57] ABSTRACT

A switch-over valve for directing a compressed air flow to either one of two drying towers of an air drier, the other one being vented to the atmosphere through the valve. A positively operated valve body is movable between two valve seats in a central chamber. A valve sleeve arranged at either side of the valve body is axially movable in a dividing wall between the central chamber and a respective outer chamber connected to the drying tower, is spring biased in a direction towards the valve body to a position where a radial valve sleeve flange in the outer chamber is in sealing contract with the wall, and is biased in the opposite direction by the valve body for lifting the flange from the wall and venting out the air from the outer chamber to the atmosphere through a channel in the wall.

14 Claims, 3 Drawing Sheets

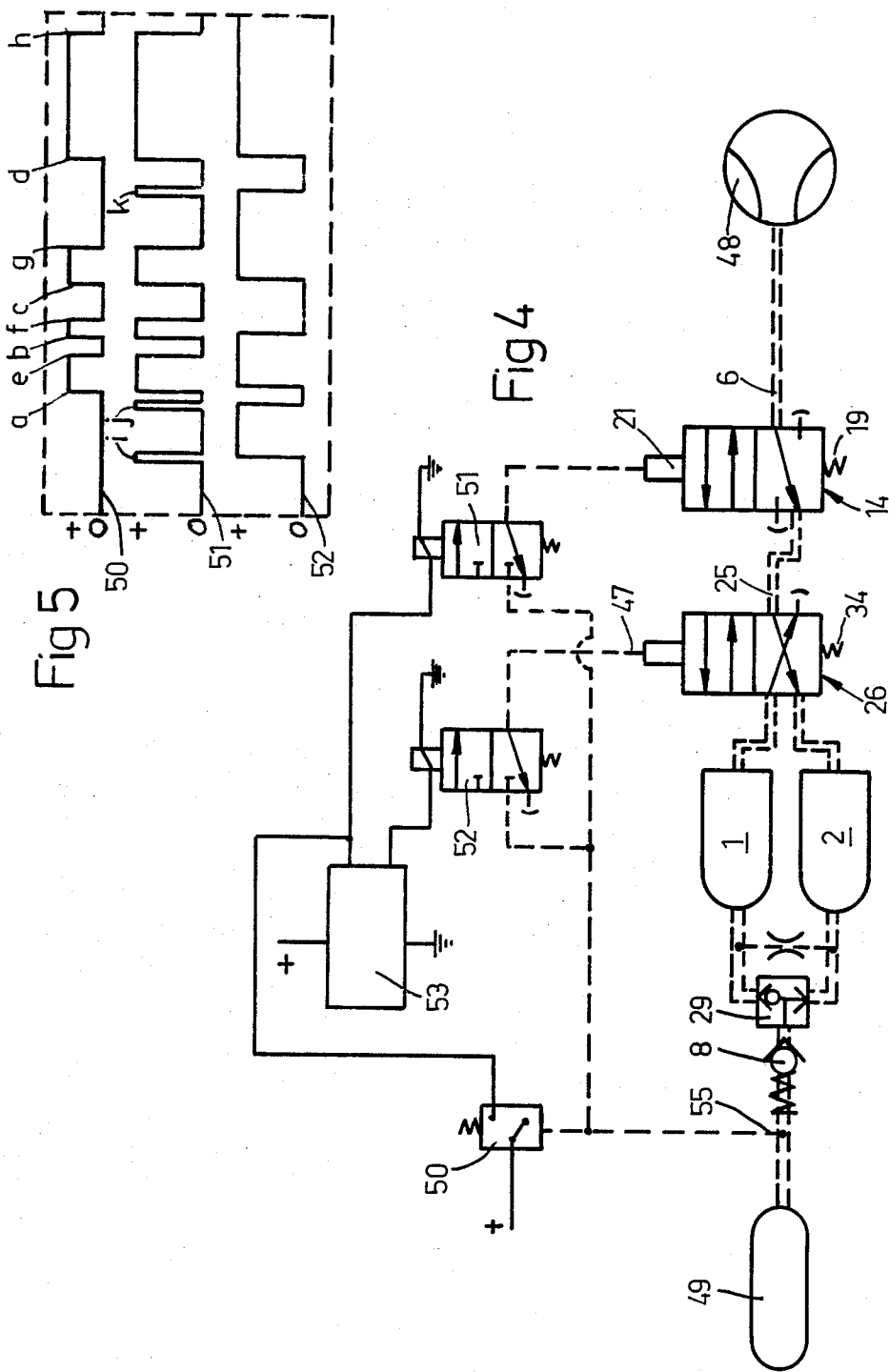

SWITCH-OVER VALVE, PREFERABLY FOR AN AIR DRIER

TECHNICAL FIELD

This invention relates to a switch-over valve for directing an air flow to either one of two compartments, the other one concurrently therewith being vented to the atmosphere through the valve. The valve according to the invention can preferably but not exclusively be used for an air drier of the type having two drying towers.

BACKGROUND OF THE INVENTION

In an air drier of the type with two drying towers containing desiccant one of the towers is used for drying air emanating from the compressor in the system, while at the same time the desiccant in the other tower is regenerated by a small fraction of the dried air, which is passed back through the desiccant. The switch-over between the two towers is to be accomplished by a valve, which may also have the function to vent out the regenerating air from the tower that for the time being is not used for drying the air. The valve for these two functions is a 2-way valve with 4 seats and is to be controlled to switch-over between its two positions by an external force.

In the design of the valve the fact that the main air flow from the compressor to be switched-over between the two drying towers is many times bigger than the flow of regenerating air can be taken into account.

SUMMARY OF THE INVENTION

A cheap, reliable and compact switch-over valve, having the added advantage that the air flow under pressure through the air drier is not jeopardized at a possible malfunction of the valve, is according to the invention accomplished in that a positively operated valve body is movable in a valve housing between two annular valve seats in a central chamber with an air inlet conduit, the air passing by either seat to either one of two outer chambers having respective conduits connected to the respective compartments, and in that a valve sleeve arranged at either side of the valve body is axially movable in the valve seat and a dividing wall between the central chamber and the respective outer chamber, is spring biased in a direction towards the valve body to a position where a radial valve sleeve flange in the outer chamber is in sealing contact with the wall, and is biased in the opposite direction by the valve body for lifting the flange from the wall and venting out the air from the outer chamber to the atmosphere through a channel in the wall.

In a preferred embodiment the valve body is positively operated in one direction by a pneumatically actuated piston, whose piston rod is axially guided by the valve housing and is attached to the valve body by a ball joint, and in the other direction by a helical compression spring arranged between the valve body and an end wall of the valve housing.

In this way the valve body, which is not supported by the valve housing, is guided for movements between the valve seats by the piston rod as well as the spring. Still, the ball joint will allow certain tilting movements for the valve body in order to safeguard sealing engagement with the respective seat.

This engagement is further facilitated in that the cylindrical valve body has an annular edge for sealing contact with the respective seat made of rubber or similar elastic material.

The bias of the respective valve sleeve towards the valve body could well be accomplished by a separate spring means. A more elegant and simple solution is, however, that the valve seat, being immovably attached at its outer periphery to the valve housing in the central chamber, is attached at its inner periphery to the valve sleeve and is shaped for subjecting the valve sleeve to the spring bias in the direction towards the valve body.

The valve seat is hereby preferably mounted in grooves in the valve housing and the valve sleeve, respectively, and has a frusto-conical shape in a side-view.

An important advantage with the valve design according to the invention is that the whole arrangement with the valve body, the valve seats and the valve sleeves is "floating" and that it does not require any special tolerances for the components, which leads to a minimized production cost.

BRIEF DESCRIPTION OF THE DRAWINGS

The invention will be described in further detail below reference being made to the accompanying drawings, in which FIG. 4 is a diagram of an air drier system incorporating a valve according to the invention, and FIG. 5 illustrates a sequence control of the air drier.

DETAILED DESCRIPTION OF THE PREFERRED EMBODIMENT

Figure 1:
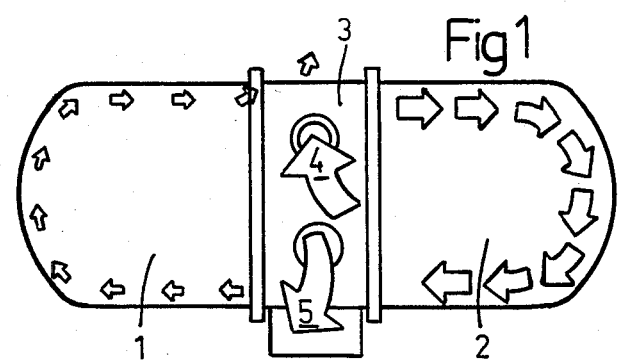
FIG. 1 is a schematic side-view of an air drier incorporating the invention.

A compressed air system, typically but not necessarily to be used on heavy road vehicles, can include an air drier of the type depicted in FIG. 1. Such an air drier—which in this case is of the co-called two-tower type—is placed in the system between a compressor and an air tank, and its purpose is to remove humidity from the air delivered from the compressor so as to supply the different air consuming components on the vehicle with dry air.

Generally speaking and as shown in FIG. 1, an air drier according to the invention consists of a left drying tower 1, a right drying tower 2, and a centre part 3 containing valves and other means needed for the proper function of the air drier. Each drying tower 1 and 2 contains a filter and desiccant in a cartridge.

In use the compressed air flows from the compressor as indicated by the numeral 4 through one of the towers to be dried (in FIG. 1 the right tower 2 as illustrated by bigger arrows) and further to the air tank as indicated by the numeral 5. At the same time the other tower is regenerated, i.e. the desiccant therein is dried from the moisture adsorbed during its previous air drying cycle. The regeneration is performed in that a small amount of the dried air delivered from the air drier is passed through the tower to be regenerated and is then vented out to the atmosphere (as illustrated by smaller arrows in the left tower 1 in FIG. 1).

Figure 2:
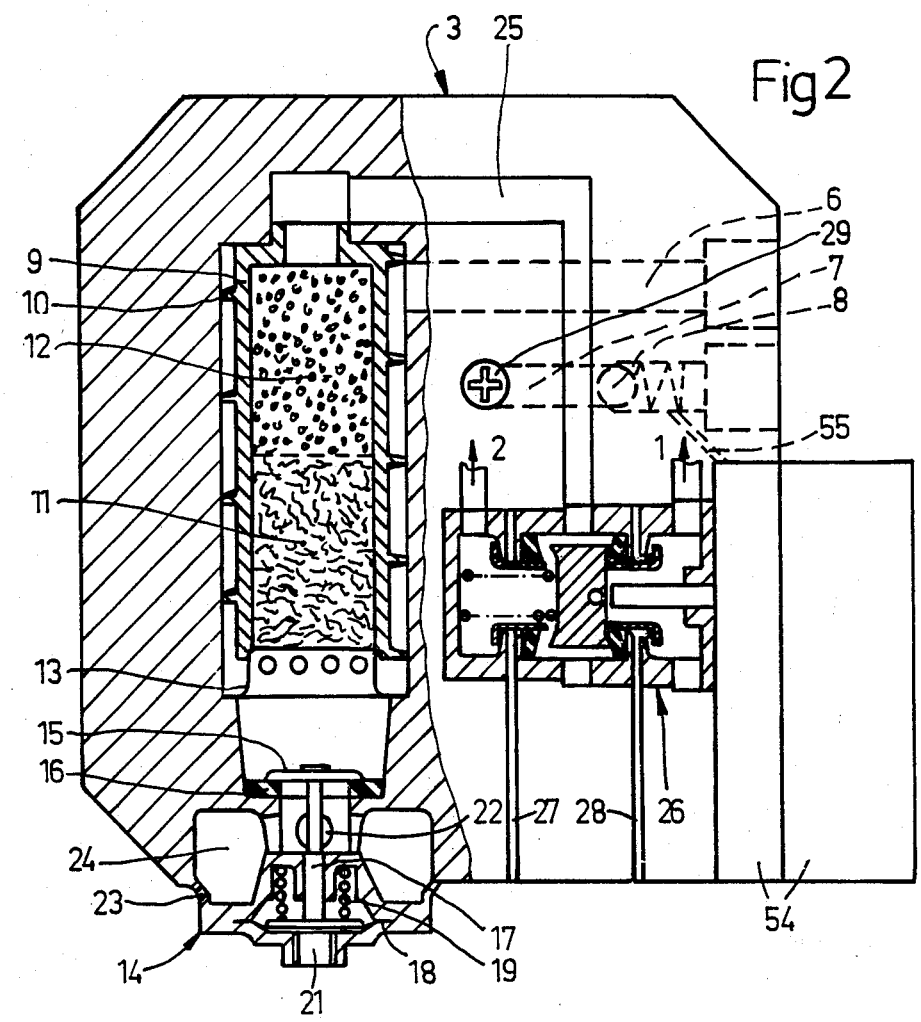
FIG. 2 is a partly sectional view through a centre part of the air drier.

FIG. 2 is a side-view, partly in section, of the centre part 3 containing the different valves, filters and control means to be described below.

An air inlet duct 6 is to be connected to the compressor for receiving the humid air. An air outlet duct 7 is to be connected to the air tank and contains an ordinary spring-biased check valve 8 with the function to prevent air from the air tank from returning to the air drier 5 when the pressure therein is lower than that in the air tank.

The air inlet duct 6 leads to the upper part of a cylindrical compartment. Therein is arranged a cylindrical filter sleeve 9 having an external helical flange 10, which sealingly engages the compartment wall so as to form a helical path downwards outside the sleeve 9 for the air entering through the inlet duct 6.

The filter sleeve 9 is filled with metal wool 11 or similar material in its lower half and foam plastic 12 or similar material in its upper half. A cup 13 under the sleeve 9 is provided with holes so as to allow entrance of air from the helical path outside the sleeve to the interior thereof.

An unloader valve 14 provided below the sleeve 9 has a valve disc 15 sealingly engaging a sealing ring 16, a valve spindle 17 axially movable and attached to the valve disc 15, and a diaphragm disc 18 attached to the spindle 17. A helical compression spring 19 acts on the diaphragm disc 18 in the direction for holding the valve disc 15 in sealing contact with the sealing ring 16. A diaphragm 20 is clamped below the diaphragm disc 18 for sealing off a compartment at a connection 21. Openings 22 are provided under the valve disc 15, and ventilating holes 23 in the unloader valve 14 lead to the atmosphere. On its way out to the atmopshere through the unloader valve 14 the air has to pass sound absorbing material in chamber 24.

When the unloader valve 14 is closed (under the bias from the spring 19), which is the normal condition and means that air drying can take place, air flows at high speed in the helical path created by the helical flange 10. The helical path acts as a condensor and cyclone, so that water droplets and the like are separated from the air and gathered in the bottom region at the valve disc 15. This separation takes place without appreciably restricting the flow. After having passed into the filter sleeve 9 the air flows upwards through the material 11, where primarily oil contaminants and the like are separated or filtered off, and through the material 12, acting as a filter for other particles transported with the compressed air.

When the unloader valve 14 is opened due to a signal (to be described in conjunction with FIG. 4) in the form of an overpressure in the connection 21, the valve disc 15 is lifted from its sealing 16, so that the air from the compressor flows out into the atmosphere without appreciable restriction through the openings 22, the sound absorbing material in chamber 24, and the ventilating holes 23 and so that the overpressure in the whole air drier is lowered to atmospheric pressure. Hereby the water and the like gathered at the valve disc 15 is drained out, and the flow of air from the air drier to the atmosphere passes through the materials 11 and 12 conveying away oil, particles and the like gathered therein. The flow velocity can hereby be controlled by the choice of suitable material, especially the foam plastic 12, so that the desiccant in the respective drying tower 1 or 2 is not damaged.

From the separator and filter unit 9–13 as described above the compressed air flows through a conduit 25 to a 2-way control valve 26. This valve will be described in further detail below under reference to FIG. 3, but it has the function on one hand to direct the air flow to either one of the two drying towers 1 or 2, on the other hand to direct regenerating air from either one of the drying towers 2 or 1 to the atmopshere through drainage conduits 27 and 28. With the control valve 26 in the position shown in FIG. 2 the air flow from the compressor will be directed to the right drying tower 2, whereas the regenerating air from the left drying tower 1 is vented out to the atmosphere through the drainage conduit 28. As will appear more clearly from the description below, the control valve 26 is positively controlled.

Also visible in FIG. 2 at the outlet duct 7 is a double-acting check-valve 29, which has the main function to allow the air flow out from the drying air tower (under pressure), while at the same time closing off the other air tower. However, by being provided with a through bore in its valve body, the valve will lead a fraction of the dry air back into the other drying tower for regenerating the desiccant therein.

Figure 3:
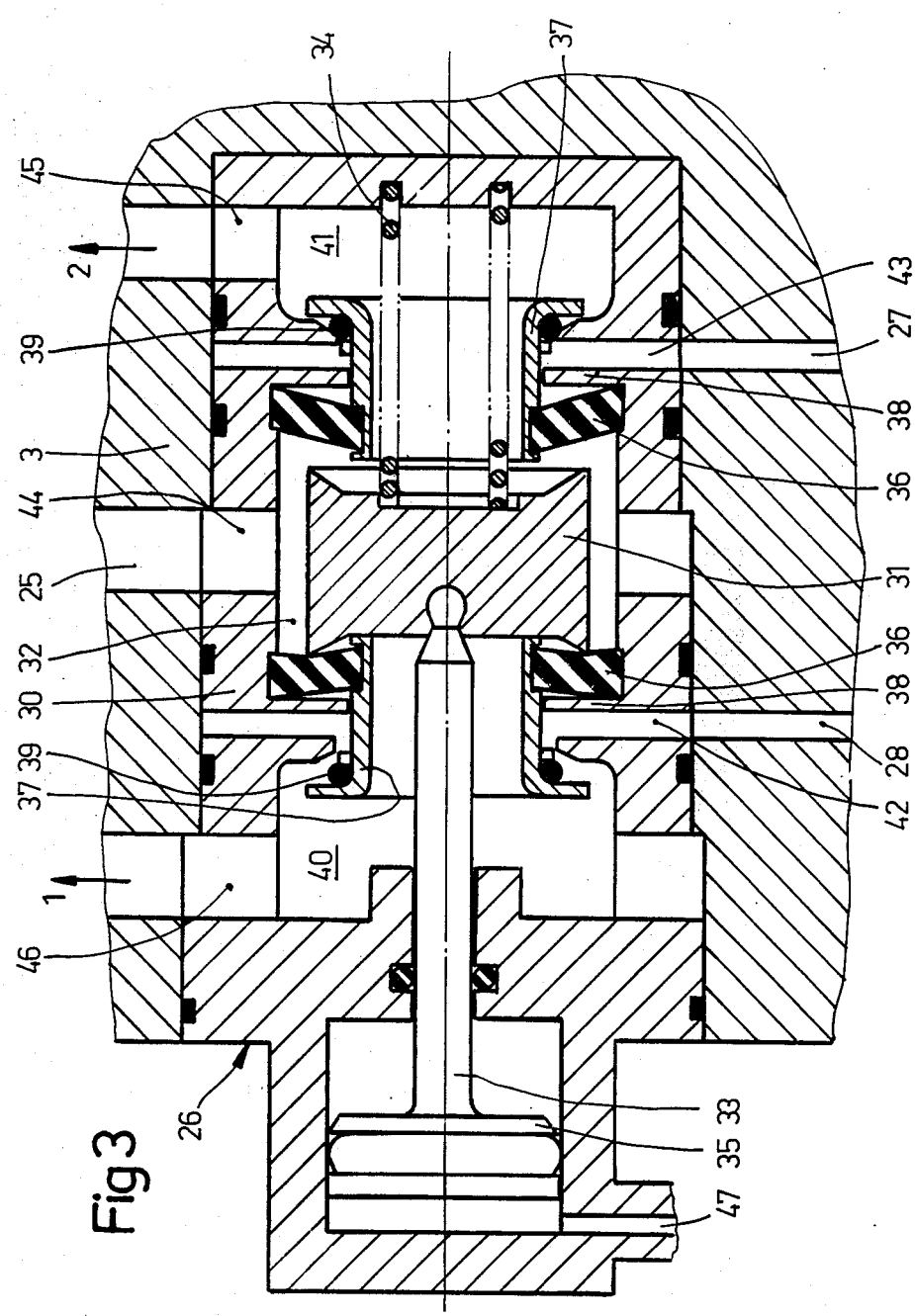
FIG. 3 is a sectional view to a larger scale of a control valve for the air drier.

The control valve 26 is shown to a larger scale in FIG. 3, to which reference now is made.

A multi-chambered valve housing 30 is sealingly mounted in the centre part 3. A cylindrical valve body 31 is axially movably arranged in a central chamber 32 therein under the bias and guidance of a piston rod 33 and a helical compression spring 34. The piston rod 33 is integrated with a piston 35, is axially guided by the valve housing 30 and is attached to the valve body 31 by means of a ball joint so as to give the body a certain orientation adaptability.

At either side of the valve body 31 an annular valve seat 36 is mounted in a groove in the housing 30 in the central chamber 32. This valve seat 36 is made of rubber or similar elastic material and has a frusto-conical shape in a side-view.

At its inner periphery the valve seat 36 is mounted in an external groove in a valve sleeve 37, which is axially movable and guided by a dividing wall 38 of the valve housing 30. The valve seat 36 biases the valve sleeve 37 towards a position where a radial flange thereon abuts the wall 38. An O-ring 39 provides a seal between the flange and the wall, as can be seen to the right in FIG. 3. If the flange of the valve sleeve 37 is lifted from contact with the wall 38, as can be seen to the left in FIG. 3, there will be a passage from a left outer chamber 40 (or right outer chamber 41, respectively) to a left channel 42 in the wall 38 (or a right channel 43, respectively). These two channels 42 and 43, respectively, are connected to the two drainage channels 28 and 27, respectively, which were mentioned above in connection with FIG. 2 and lead to the atmosphere.

In the rest position of the valve 26 as shown in FIG. 3 the valve body 31 is held with an annular edge in sealing contact with the left valve seat 36 under the bias of the spring 34, whereas there is no contact between the valve body 31 and the right valve seat 36. Accordingly, air stemming from the compressor can flow through the conduit 25 in the centre part 3, through a conduit 44 in the valve housing 30 to the central chamber 32, further to the right chamber 41 through the open central part of the sleeve 37 and out to the right drying tower 2 through a conduit 45.

At the same time regenerating air from the left drying tower 1 enters the left chamber 40 through a conduit 46, passes the flange of the left valve sleeve 37, which is lifted from the wall 38 by the valve body 31 under the force from the spring 34, and leaves to the atmosphere through the channels 42 and 28.

If the piston 35 moves to the right in FIG. 3 with a force overcoming that of the spring 34 under fluid pressure admitted through a conduit 47, the completely opposite situation results: the main air flow goes from the conduit 25 to the left drying tower 1 past the left valve seat 36, whereas the regenerating air from the right drying tower 2 goes to the atmosphere through the channels 43 and 27 past the right valve sleeve 37, which now is lifted from the right wall 38 by the valve body 31 in its right end position.

The "floating" arrangement with the cooperation between the valve body 31, the valve seats 36, the walls 38 and the valve sleeves 37 has the distinct advantages of a comparatively simple design for a 2-way valve and a low production cost due to the complete lack of critical tolerances, while still the accuracy and reliability of the function are guaranteed.

Reference is now made to FIG. 4. In the lower part thereof the system described above under reference to FIGS. 1-3 can be recognized. From the compressor—here provided with the numeral 48—the air passes the unloader valve 14 and the control valve 26 to either of the drying towers 1 and 2—in the case shown the tower 12. On its way from the drying tower the air passes the double check-valve 29, where a fraction of the dry air is passed back through the restriction to the tower 1 as regenerating air. After having passed out of the air drier that air is collected in the air tank—here provided with the numeral 49.

As earlier described, the unloader valve 14 is held in its "normal" position allowing passage of air from the compressor 48 to the conduit 25 in the air drier under the bias of the spring 19, wheras its switch-over to the second position, in which both the air from the compressor and the conduit 25 is vented to the atmosphere, is effected at a pneumatic signal in the form of an overpressure at the connection 21.

Likewise, the control valve 26 is held in its "normal" position by the spring 34, whereas a switch-over is effected at a pneumatic signal in the form of an overpressure through the conduit 47.

The upper part of FIG. 4 depicts an electropneumatic system for controlling the unloader valve 14 and the control valve 26 and thus the function of the whole air drier.

In this upper part of FIG. 4 broken lines are used for pneumatic connections and full lines for electrical connections.

The components of the control system are a pressure switch 50, a first pilot valve 51, a second pilot valve 52, and an electronic control device 53. These components together with the pneumatic and electrical connections are placed in the centre part 3 of the air drier so as to create a self-sustained unit, which besides the air lines from the compressor and to the air tank only requires a voltage supply for its function. The complete control system is housed in the portions 54 of the centre part 3, as shown in FIG. 2.

The pressure in the air tank 49 equals the pressure in the outlet from the air drier, i.e. after the check-valve 8. It is supplied through a bore 55 (FIG. 2) to the pressure switch 50 and the two pilot valves 51 and 52.

The pressure switch 50 is of the spring-biased type keeping the electrical connection broken until at rising pressure a certain pressure—for example 8,2 bar—has been reached and connection established; at lowering pressure the connection will again be broken at a certain lower pressure—for example 7,0 bar.

The two pilot valves 51 and 52 are normally closed under spring bias but can be opened by an electrical signal provided from the electronic control device 53. In the practical case the voltage supplied is 24V DC to the pressure switch 50 as well as to the control device 53.

FIG. 5 is a sequence diagram illustrating the two positions of the two pilot valves 51 and 52, respectively, as controlled by the pressure switch 50 and the electronic control device 53. The diagram is just to be seen as an example of what can happen, and its purpose is to illustrate the principles of the control.

It may first be noted that at each time the pressure switch 50 is closed (indicating a filled air tank 49)—points a-d—the pilot valve 51 is activated for the same period of time as the pressure switch remains closed. The result hereof is that the unloader valve 14 is activated or "opened" under the air pressure from the bore 55 through the pilot valve 51 to the connection 21. The air from the compressor 48 as well as the air from the air drier is hereby vented to the atmosphere. This situation prevails until the pressure in the air tank 49 lowers and the pressure switch 50 opens again—points e-h.

If the time period during which the pressure switch 50 remains open exceeds for example three minutes (indicating a continuous air loading to the system from the compressor 48), the control device 53 will supply a rather short electrical signal to the pilot valve 51, as indicated by the "spikes" i-k in FIG. 5. The result is again that the unloader valve 14 is "opened" during the time said electrical signal lasts—say 5-6 seconds.

As earlier described, the switch-over valve 26 governs which drying tower 1 or 2 that will be used for drying air (while the other one is regenerated), and the second pilot valve 52 controls the position of the switch-over valve 26. The electrical control of the pilot valve 52 by the electronic control device 53 is such that each positive signal to the first pilot valve 51 (or rising flank on the line 51 in FIG. 5) will result in a change of condition for the second pilot valve 52 (activation or deactivation) or in other words a switch-over between the two drying towers 1 and 2 caused by the switch-over valve 26. In order to see to it that the switch-over occurs with de-pressurized air, the changing signal to the second pilot valve 52 is somewhat delayed (for example in the region of 2-3 seconds) in relation to each rising flank on the line 51 in FIG. 5. The reason for accomplishing the switch-over with de-pressurized air is that the stresses and wear on the different components thereby is minimized.

The provision of the spikes i-k (even if the pressure switch 50 is not closed) has the purpose of accomplishing a switch-over between the two drying towers 1 and 2 during long periods of continuous air loading to the system.

Modifications are possible within the scope of the appended claims, which are not limited to the use of the invention in air driers, especially not air driers to be used on vehicles.

I claim:

1. A switch-over valve for connection to inlets to two compartments to selectively permit flow into one compartment while the other compartment is vented to permit flow therefrom, said valve comprising:
   (a) valve housing means including an inner chamber and an outer chamber at opposite ends of the inner chamber, dividing wall means between the inner chamber and the respective outer chambers, the dividing wall means each including openings to permit flow between the inner chamber and a respective one of the outer chambers, first conduit means communicating with the inner chamber for admitting fluid into the inner chamber of the housing means, and second and third conduit means communicating with respective ones of the outer chambers to permit flow out of the housing means;

(b) a pair of annular valve seat means carried within the inner chamber and spaced from each other, the valve seat means each including a valve opening to permit communication between the inner chamber and the respective outer chambers;

(c) valve body means within the inner housing and movable between the respective valve seat means to selectively open one valve opening and close the other valve opening;

(d) sleeve means extending between the inner chamber and a respective outer chamber and slidably movable within each valve opening and positioned on opposite sides of the valve body means, the sleeve means including sealing means engageable with the respective dividing wall means;

(e) first biasing means within the valve housing means to bias the valve body means into sealing contact with one of the valve seat means;

(f) second biasing means carried by each of the sleeve means for urging the respective sleeve means into sealing engagement with the dividing wall means; and (g) vent channel means communicating with a respective one of the outer chambers and closable by sealing engagement of the sleeve sealing means with the respective dividing wall means to permit vent flow from only one end chamber while the other end chamber is in communication with the first conduit means.

2. A valve according to claim 1, including third biasing means carried within the housing and selectively operable to act on the valve body means in opposition to the first biasing means.

3. A valve according to claim 2, wherein the third biasing means is fluid actuated.

4. A valve according to claim 3, wherein the third biasing means includes a fluid operated piston having a piston rod in contact with the valve body means.

5. A valve according to claim 4, wherein the piston rod includes a ball end and the valve body means includes a socket that receives the ball end of the piston rod.

6. A valve according to claim 5, wherein the piston rod is slidably carried in and is axially guided in the valve housing means.

7. A valve according to claim 6, wherein the first biasing means is a compression spring.

8. A valve according to claim 1, wherein the valve body means is substantially cylindrical and includes an annular edge at each end engageable with a respective valve seat means.

9. A valve according to claim 1, wherein the valve seat means are made from an elastic material.

10. A valve according to claim 9, wherein the valve seat means extend between the inner surface of the inner chamber and the outer surface of the respective sleeve means.

11. A valve according to claim 10, wherein the valve seat means urge the respective sleeve means toward the valve body means.

12. A valve according to claim 11, wherein the inner surface of the housing means includes a pair of spaced annular grooves, and the valve seat means each include an outer portion received in the respective annular groove.

13. A valve according to claim 12, wherein the sleeve means include an outwardly facing circumferential annular groove at an end closest to the valve body means, and the valve seat means each include an inner portion received in a respective sleeve means groove.

14. A valve according to claim 1, wherein the valve body means floats relative to the inner wall of the inner chamber and has an outer surface spaced inwardly from the inner wall of the inner chamber.

* * * * *